Feb. 18, 1930. R. LANGLOIS 1,747,941
WINDING FOR DYNAMO ELECTRIC MACHINES
Filed July 17, 1925 3 Sheets-Sheet 3

Patented Feb. 18, 1930

1,747,941

UNITED STATES PATENT OFFICE

RICHARD LANGLOIS, OF PARIS, FRANCE, ASSIGNOR TO FORGES & ATELIERS DE CONSTRUCTIONS ELECTRIQUES DE JEUMONT, SOCIETE ANONYME, OF PARIS, FRANCE, A FRENCH JOINT-STOCK COMPANY

WINDING FOR DYNAMO-ELECTRIC MACHINES

Application filed July 17, 1925, Serial No. 44,241, and in France July 22, 1924.

This invention relates to multiplex parallel winding for dynamo electric machines with two commutators.

In continuous current dynamo-electric machines with windings in the form of conductor bars it has been found desirable for high current intensities to employ multiplex parallel windings with the object of diminishing the current in each conductor bar. At the same time the commutator has been divided into two portions placed one on each end of the armature.

The practical realization of these multiplex parallel windings with two commutators is rendered difficult by the creation of objectionable currents circulating between the two commutators: one of the commutators then takes over the whole load and the satisfactory commutation becomes impossible.

The present invention has for its main object to avoid, in the case of an armature winding of duplex parallel or other even order of multiplicity, and with two commutators, any circulation of current from one commutator to the other, by the use of rigorously equipotential connections, comprising comparatively few longitudinal connectors between corresponding bars of the two commutators and a number of rings which connect corresponding bars of each commutator, there being at each end of the armature as many of these equipotential rings as there are commutator bars or segments per pole.

These connections have the further advantage of ensuring the commutation of the half-coil, that is to say, that the voltage between the adjacent segments of the commutator is that generated in a single active bar of the armature winding.

The complete coils are always of whole pitch, one part embracing a little more, and the other part a little less than the polar pitch, in such a way that the electromotive forces induced in each coil are rigorously equal.

Moreover, the invention allows of obtaining a constant rate of change of the magnetic flux cut by the short-circuited coil, even when there are employed several sections or conductors per slot, by the use of a double or divided armature core of which the two parts are staggered or turned in angular relation to the extent of one half of the pitch of the teeth or slots, so that each slot in one half of the armature comes into line with a tooth in the other half; the conductors occupying the same slot in one part of the core diverge into adjacent slots in the other part.

It is known to be advantageous in continuous current machines to reduce the number of slots for a given total number of conductors, with the object of diminishing the self-induction and therefore the energy to be dealt with at commutation; for example two or four sections may be arranged in each slot; but such an arrangement becomes asymmetrical, the bars under commutation occupying different positions in the slot. My improved construction with staggered duplex armature core reestablishes a rigorous symmetry and gives the same regularity as if there were only one section or conductor in each slot.

Upon the accompanying drawings:—

Figure 1:
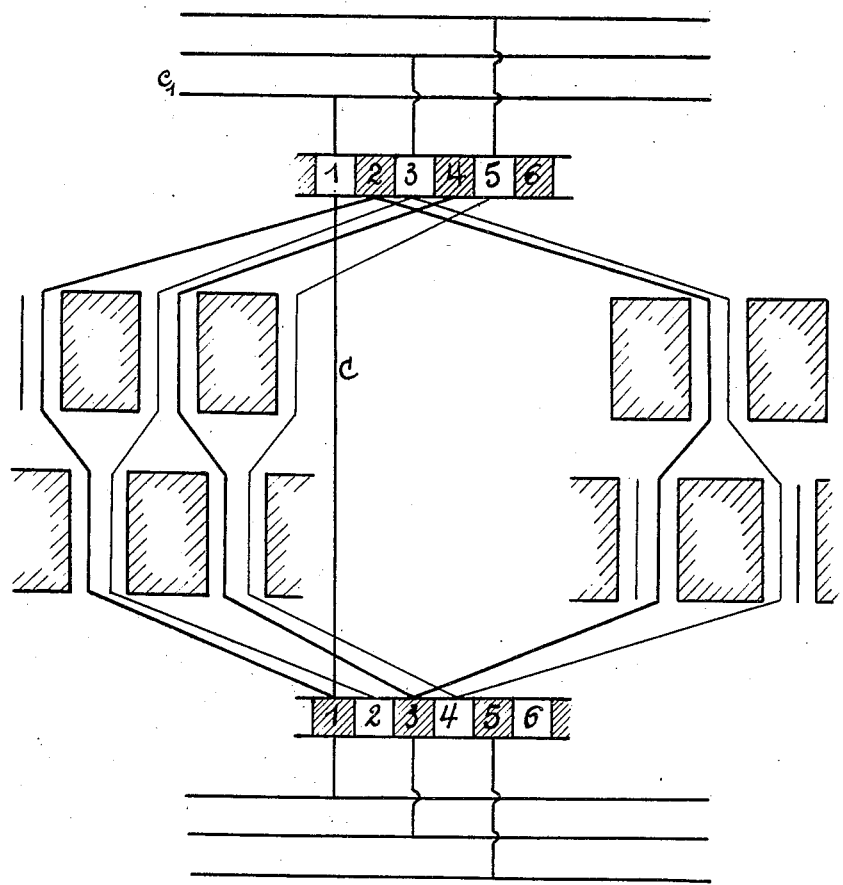
Figures 1 and 2 represent diagrammatically two forms of duplex parallel winding in accordance with the invention, with two and four sections per slot respectively, the number of commutator segments being even.
Figure 2:
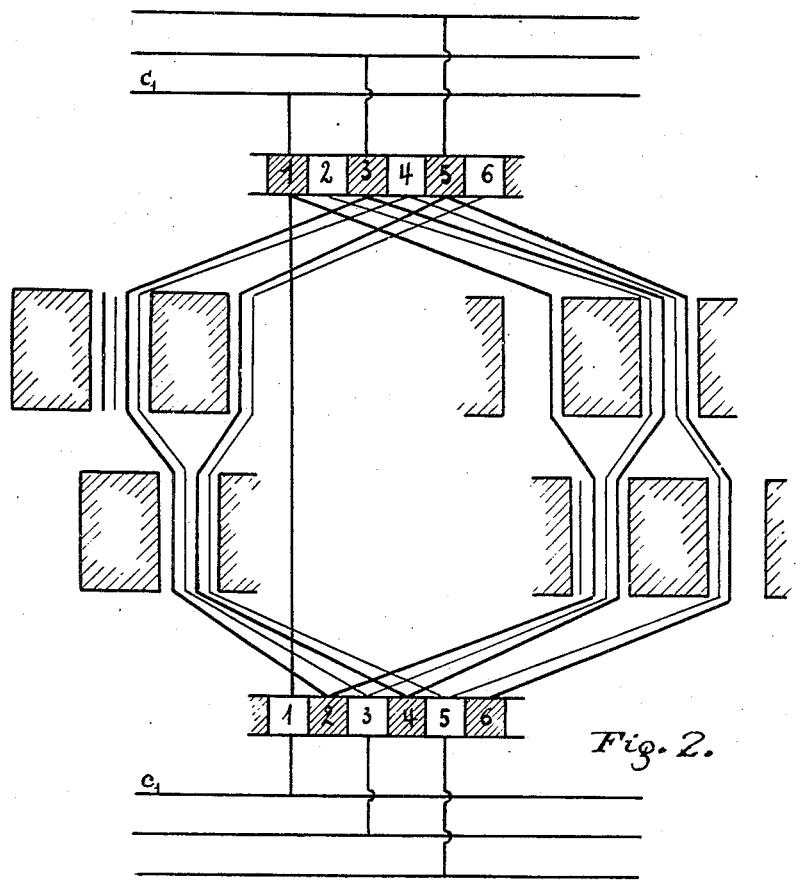

Referring to Figures 1 and 2, the separate windings are distinguished by indicating one in thick lines and the other in thin lines. The segments or bars of the same numerical order in the two commutators correspond with one another and are set at the same angular position; the bars cross-sectioned are connected to the ends of the first winding (shown in thick lines) and those unsectioned are connected to the other winding (shown in thin lines).

Figure 3:
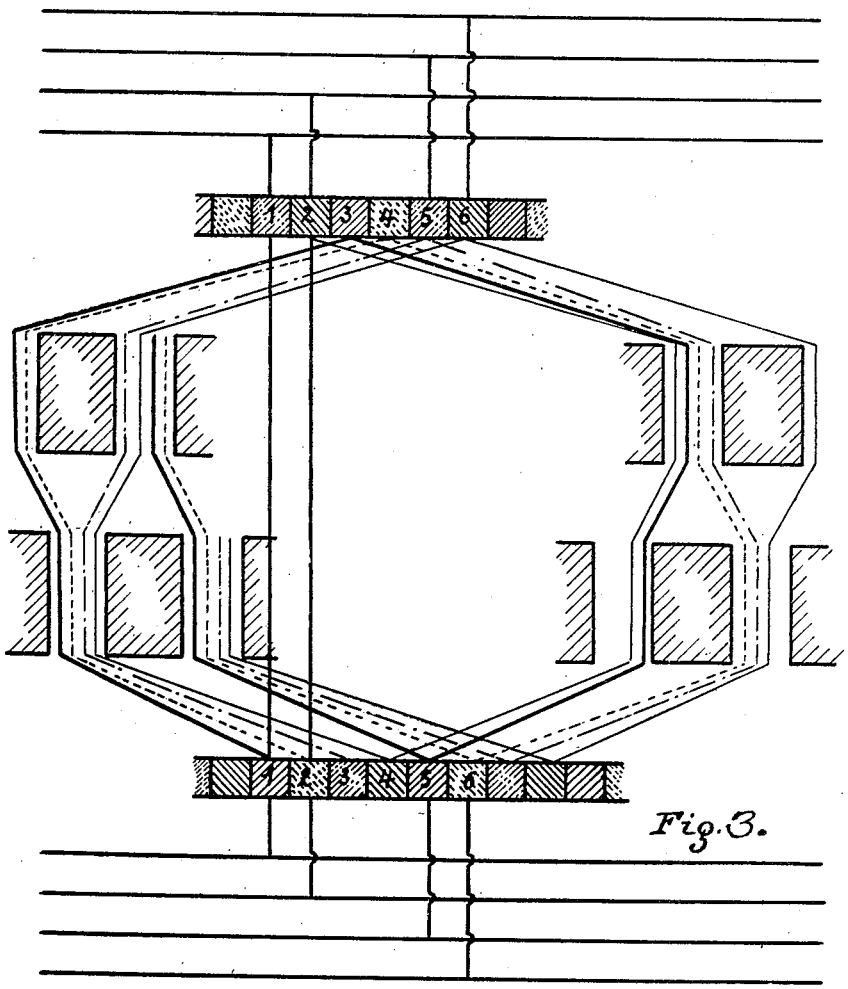
Figure 3 is a diagram of another form of winding, viz, quadruplex parallel.

The commutator bars or segments 1, 3, 5 ... of each winding, that is, at each end of the armature, are connected each to an equipotential ring $C_1$ $C'_1$; these rings are formed by equi-potential connectors in series, each extending as shown in Figure 3, between two corresponding bars in one of the commutators, viz, two bars at double the polar pitch apart. There will thus be at each end of the armature as many equi-potential rings $C_1$ $C_2$ $C_3$ . . . as there are commutator segments per pole.

Further the two commutators are interconnected by equi-potential connections C of the known kind, but these longitudinal connectors are comparatively few in number, the rings $C_1$ . . . on one side being connected each with a homologue $C'_1$ . . . on the other side, which is at the same potential. Only a single longitudinal connector C between each pair of equipotential rings $C_1$ $C'_1$ is necessary. These connectors C give the advantage of half-coil commutation or rectification, for they effect a direct short circuit between the equi-potential points of the two windings, but half-coil commutation is rigorously established only if the homologous rings on the two sides are exactly at the same potential; this condition is approached the more closely as the number of the connectors C is further increased.

The armature core is provided with teeth alternating with the slots for the conductors, but instead of the slots extending from end to end of the core, the slots in one part of the core are advanced in angular relation to those in the other part by half of their pitch, so that the teeth at the two ends are staggered as indicated in the diagrams. Due to this arrangement of the coils, the rate of change $\frac{d\Phi}{dt}$ of the magnetic flux ($\Phi$) through the short-circuited coil, and therefore the induced electromotive force in the coil, is constant, the use of a double or divided armature core having for effect that the bars subject to commutation occupy rigorously symmetrical positions in the slot.

Figure 3 represents diagrammatically a quadruplex parallel winding with four sections per slot, two windings being marked by thick and by thin lines as in Figures 1 and 2, a third winding by dotted lines and a fourth by chain lines; the commutator segments are cross-sectioned in four different ways to correspond.

It will be seen that in all cases a rigorous symmetry of the conductors is obtained at different moments of the commutation as a result of the division and staggering of the armature core.

It will be understood that the invention is applicable not only to duplex parallel windings but to any winding having an even order of multiplicity adapted for use with two-commutator machines.

What I claim is:—

1. An armature winding, comprising conductors joined in separate series, the end-connections joining said conductors being alternately of greater and less angular length than the pole pitch, two commutators at opposite ends of the armature, successive segments of each commutator being connected to the junction points of the different series in turn, equipotential connectors between all the corresponding segments of each commutator, and equipotential connectors between corresponding segments of the two commutators.

2. An armature winding, comprising conductors joined in separate series, said conductors of different series sharing armature slots in staggered relation, two commutators at opposite ends of the armature, successive segments of each commutator being connected to the junction points of the separate series of conductors in turn, connectors between corresponding segments of the two commutators, and a plurality of equipotential rings at each end of the armature, alternate segments of each commutator being connected in turn to the equipotential rings at the adjacent end of the armature.

3. An armature winding, comprising conductors joined in separate series, said conductors of different series sharing armature slots in staggered relation, two commutators at opposite ends of the armature, successive segments of each commutator being connected to junction points of the separate series of conductors in turn, and equi-potential connectors between corresponding segments of said commutators.

4. In an electrical machine, the combination of a slotted armature core, said armature core comprising two parts having their respective slots staggered to the extent of one half the pitch of the slots, a duplex parallel winding including two series of conductors occupying said slots, conductors of different series occupying the same slot in one part of said armature core and diverging into different slots in the other part of said armature core, two commutators at opposite ends of said armature core, successive segments of each of said commutators being joined to junction points of alternate series of conductors, and equi-potential connectors between corresponding segments of said commutators.

5. In an electrical machine, the combination of a slotted armature core, said armature core comprising two parts having their respective slots staggered to the extent of one half the pitch of the slots, an armature winding including separate series of conductors occupying said slots, conductors of different series occupying the same slot in one part of said armature core and diverging into different slots in the other part of said armature core, and two commutators at opposite ends of said armature core, successive segments of each of said commutators being joined to junction points of the separate series of conductors in turn.

In testimony whereof I hereunto affix my signature.

RICHARD LANGLOIS.